US 8,140,709 B2

(12) United States Patent
Rochon et al.

(10) Patent No.: US 8,140,709 B2
(45) Date of Patent: Mar. 20, 2012

(54) TWO STAGE INTERNET PROTOCOL HEADER COMPRESSION

(75) Inventors: Michel Rochon, Kanata (CA); Adrian Ellsworth, Stittsville (CA); Bradley W. Duck, Carp (CA)

(73) Assignee: Alcatel Lucent, Paris (FR)

( * ) Notice: Subject to any disclaimer, the term of this patent is extended or adjusted under 35 U.S.C. 154(b) by 358 days.

(21) Appl. No.: 12/537,832

(22) Filed: Aug. 7, 2009

(65) Prior Publication Data

US 2011/0032952 A1 Feb. 10, 2011

(51) Int. Cl.
*G06F 15/16* (2006.01)
(52) U.S. Cl. ...................................... 709/247
(58) Field of Classification Search .............. 709/238, 709/247
See application file for complete search history.

(56) References Cited

U.S. PATENT DOCUMENTS

| | | | |
|---|---|---|---|
| 6,041,054 A * | 3/2000 | Westberg | 370/389 |
| 6,608,841 B1 * | 8/2003 | Koodli | 370/474 |
| 6,751,209 B1 * | 6/2004 | Hamiti et al. | 370/349 |
| 6,791,982 B2 * | 9/2004 | Westberg | 370/392 |
| 6,950,445 B2 * | 9/2005 | Svanbro et al. | 370/477 |
| 7,221,657 B2 * | 5/2007 | Bergenlid et al. | 370/252 |
| 7,398,325 B2 * | 7/2008 | Weller | 709/247 |
| 7,430,617 B2 * | 9/2008 | Walsh et al. | 709/247 |
| 7,539,188 B2 * | 5/2009 | Liao et al. | 370/389 |
| 7,558,244 B2 * | 7/2009 | Liao et al. | 370/350 |
| 7,558,882 B2 * | 7/2009 | Walsh et al. | 709/247 |
| 7,586,899 B1 * | 9/2009 | Mohaban et al. | 370/352 |
| 7,594,036 B2 * | 9/2009 | Weller | 709/247 |
| 7,876,695 B2 * | 1/2011 | Johansson et al. | 370/252 |
| 7,966,425 B2 * | 6/2011 | Weller | 709/247 |
| 7,995,533 B1 * | 8/2011 | Koodli et al. | 370/331 |
| 2002/0018010 A1 * | 2/2002 | Le | 341/60 |
| 2003/0123485 A1 * | 7/2003 | Yi et al. | 370/477 |
| 2003/0156584 A1 * | 8/2003 | Bergenlid et al. | 370/389 |
| 2004/0034708 A1 * | 2/2004 | Pelletier et al. | 709/227 |
| 2005/0160184 A1 * | 7/2005 | Walsh et al. | 709/247 |
| 2005/0271033 A1 * | 12/2005 | Nakash | 370/349 |
| 2007/0211724 A1 * | 9/2007 | Johansson et al. | 370/392 |
| 2009/0003347 A1 * | 1/2009 | Yang et al. | 370/392 |
| 2009/0238185 A1 * | 9/2009 | Horn et al. | 370/392 |

OTHER PUBLICATIONS

Aiken, et al., Microsoft Computer Dictionary, 2002, Microsoft Press, 5th Edition, pp. vii, 38.*
Megermark, M. "IP Header Compression", Network Working Group, Request for Comments: 2507, Category: Standards Track, Feb. 1999.

* cited by examiner

*Primary Examiner* — Wing Chan
*Assistant Examiner* — Alicia Baturay
(74) *Attorney, Agent, or Firm* — Kramer & Amado P.C.

(57) ABSTRACT

Various exemplary embodiments relate to a method and related network system including one or more of the following: receiving a packet having a header and belonging to a flow; identifying a context identifier (CID) associated with the flow; morphing the header into a pseudo-compressed header, the pseudo-compressed header including the CID associated with the flow; determining whether the packet should be transmitted with a compressed header, a full header, or an uncompressed header; morphing the pseudo-compressed header into a compressed header to form an outgoing packet when the packet should be transmitted with a compressed header; morphing the pseudo-compressed header into a full header to form an outgoing packet when the packet should be transmitted with a full header; restoring the uncompressed header to form an outgoing packet when the packet should be transmitted with an uncompressed header; and transmitting the outgoing packet over the communications network.

18 Claims, 7 Drawing Sheets

TWO STAGE INTERNET PROTOCOL HEADER COMPRESSION

TECHNICAL FIELD

Various exemplary embodiments relate generally to compression of packet headers.

BACKGROUND

Modern packet-switched networks accommodate a greater number of users and larger amount of traffic than ever before. Unfortunately, the services desired by users now require a much greater bandwidth, while demanding near real-time service in many cases. Consider, for example, a typical user's experience with a mobile phone. While, several years ago, many users were content with voice-only service, many mobile phones now double as personal computers, providing access to streaming video, peer-to-peer applications, and other high bandwidth applications. Furthermore, non-mobile networks have also experienced a significant increase in traffic, as Voice Over Internet Protocol (VoIP), IP Television (IPTV), and similar services have gradually increased in popularity.

Service providers have struggled to keep pace with the ever-increasing bandwidth requirements. Given the significant expenses associated with adding additional equipment, service providers are reluctant to address this problem by simply increasing the capacity of the network. Instead, many service providers desire to decrease costs and simultaneously improve the user's quality of experience by optimizing the efficiency of data transfer over the network.

One such optimization relates to compression of headers associated with packets transferred over the network. In bandwidth-sensitive portions of the network, many service providers employ a header compression algorithm to decrease the amount of data sent over the network. As an example, this header compression may be implemented according to Request for Comments 2507, "IP Header Compression," published by the Internet Engineering Task Force (IETF) and incorporated herein by reference. More specifically, during an initialization phase, a node known as a compressor sends a full header including a context identifier ("CID"), which identifies the flow associated with the packet. A node known as a decompressor receives the full header and stores the associated CID. Subsequently, the compressor may send a "compressed" version of the header, which includes the CID, but omits much of the information included in the uncompressed header. This omitted information is stored as the "context" for the flow. Because the decompressor maintains a record of the CID and associated context, the decompressor may reconstruct the uncompressed header using the information contained in the compressed version.

Periodically, the header associated with a flow might change. For example, the value of the Time to Live (TTL) field in the IP header might change from 128 to 64. In order for the packets to be properly decompressed, the decompressor must know that the context has changed. To accomplish this, the compressor first increments a generation value associated with the CID of the flow and stores the new context. The compressor will then enter slow-start mode for the flow. Slow-start mode is a pattern of full header and compressed header packets, characterized by an exponentially increasing number of compressed header packets being sent between full header packets. For example, a compressor in slow start mode may send one full header, one compressed header, one full header, two compressed headers, one full header, four compressed headers, and so on. This ensures that the decompressor receives at least one full header so it may recognize the generation change and update the context stored for the CID accordingly.

While, in theory, this solution is capable of dramatically decreasing the bandwidth needed for most types of traffic and thus enabling faster communications, the process of compressing headers and ensuring that the decompressor is aware of each new context is, in practice, quite resource-intensive. Because a traffic management node implementing IPHC must expend extra processing power on each packet, a lesser number of packets may be processed in a given time period than if IPHC were not implemented at all. As an example, current solutions implementing IPHC might decrease the throughput of a traffic management node down to 60% of its full capacity. Full throughput could, in theory, be maintained by utilizing components capable of operating at faster speeds, but this approach would be quite expensive and would require additional real estate within the node. Accordingly, there is a need for a system capable of providing IPHC functionality while retaining near 100% throughput, without necessitating more expensive, bulkier components.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a system capable of providing IPHC functionality while retaining close to a 100% throughput rate, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

According to various exemplary embodiments, the IP header compression process is divided between two separate devices with distinct processing capabilities. A first stage device may receive a packet and proceed to "pseudo-compress" the header of the packet by determining a CID associated with the flow to which the packet belongs and then inserting that CID into the header. A second stage device may receive the pseudo-compressed header and finish the process by morphing the pseudo-compressed header into an uncompressed header, a full header, or a compressed header, depending on which alternative is appropriate for the flow at that time. The packet may then be transmitted toward its destination.

Various exemplary embodiments relate to a method and related network system for implementing IP header compression including one or more of the following: receiving a packet having an uncompressed header and belonging to a flow; identifying a context identifier (CID) associated with the flow; morphing the uncompressed header into a pseudo-compressed header, the pseudo-compressed header including the CID associated with the flow; determining whether the packet should be transmitted with a compressed header, a full header, or an uncompressed header; removing the pseudo-compressed header and adding a compressed header to the packet to form an outgoing packet when the packet should be transmitted with a compressed header; modifying the pseudo-compressed header into a full header to form an outgoing packet when the packet should be transmitted with a full header; restoring the pseudo-compressed header to the uncompressed header to form an outgoing packet when the packet should be transmitted with an uncompressed header; and transmitting the outgoing packet over the communications network.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

It should be noted that this document contains references to "uncompressed packets." This term refers to packets including an uncompressed header. Likewise, the terms "pseudo-compressed packet" and "compressed packet" refer to packets including a pseudo-compressed header and a compressed header, respectively.

Figure 1:
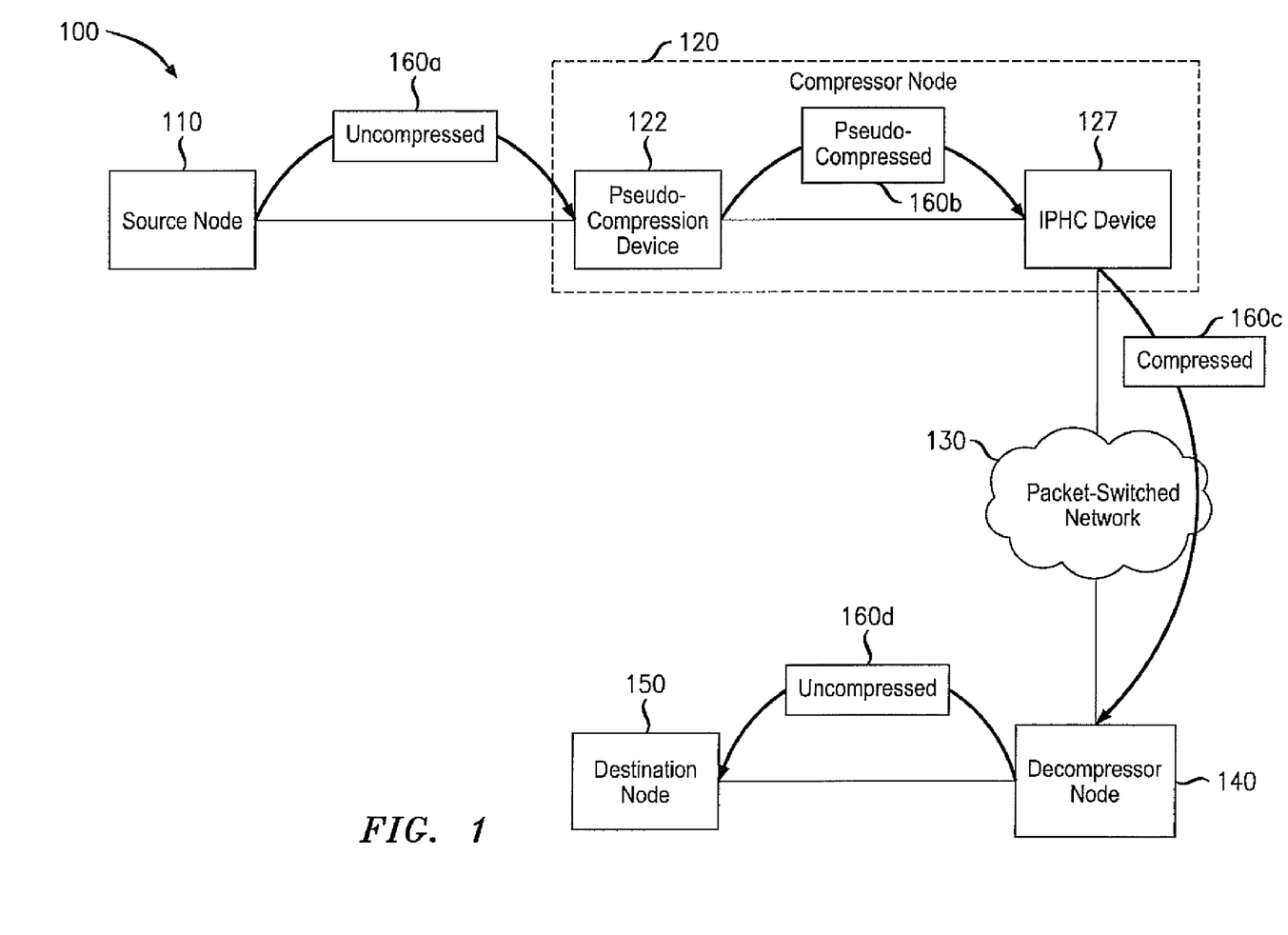
FIG. 1 is a schematic diagram of an exemplary network including a system for two-stage IP header compression.

FIG. 1 is a schematic diagram of an exemplary network 100 including a system for two-stage IP header compression. In various exemplary embodiments, network 100, which may be a telecommunications network, includes source node 110, pseudo-compression device 122, IPHC device 127, packet-switched network 130, decompressor node 140, and destination node 150. Pseudo-compression device 122 and IPHC device 127 may be separate nodes in network 100 or devices within a single compressor node 120.

Source node 110 may be any device that transmits data to destination node 150. Thus, source node 110 may be, for example, a user node, such as a cell phone, personal digital assistant, personal or laptop computer, wireless email device, or any other device that supports wireless or wired communications. Alternatively, source node 110 may be a network node that is responsible for forwarding data originating from a user node, such as a router or switch. As another alternative, source node 110 may be a service provider, server, or similar system that provides data to a user.

In various exemplary embodiments wherein pseudo-compression device 122 and IPHC device 127 are within a single compressor node 120, compressor node 120 may be a network node that receives data packets from source node 110, performs header compression on the packets, then forwards the packets to decompressor node 140 through packet-switched network 130. Thus, compressor node 120 may be a radio network controller, packet data serving node, or any other node located in a position in the network where compression of outgoing packet headers would be advantageous. Alternatively, compressor node 120 may be the same node as source node 110, such that source node 110 performs the compression itself.

Pseudo-compression device 122 may be a stand-alone network node or a device within a compressor node 120. In various exemplary embodiments, pseudo-compression device 122 receives uncompressed data packets from source node 110, performs header pseudo-compression on the packets, and then forwards the packets to IPHC device 127. Thus, pseudo-compression device may be a radio network controller, packet data serving node, or any other node located in a position in the network where pseudo-compression of outgoing packet headers would be advantageous. Alternatively, pseudo-compression device 122 may be an application-specific integrated circuit (ASIC) or other functional device within compressor node 120. As a further alternative, pseudo-compression device 122 may be part of source node 110, such that source node 110 performs the described pseudo-compression itself. The detailed operation of the components of pseudo-compression device 122 will be described in further detail with reference to FIG. 2.

IPHC device 127 may be a stand-alone network node or a device within a compressor node 120. In various exemplary embodiments, IPHC device 127 receives pseudo-compressed packets from pseudo-compression device 122; determines whether the pseudo-compressed packet should be transmitted with a full header, compressed header, or uncompressed header; morphs the pseudo-compressed header into the appropriate header, and transmits the morphed packet to decompressor node 140 via packet-switched network 130. Thus, IPHC device 127 may be a radio network controller, packet data serving node, or any other node located in a position in the network where compression of outgoing packet headers would be advantageous. Alternatively, IPHC device 127 may be a line card or other functional device within compressor node 120. As a further alternative, IPHC device 127 may be part of source node 110, such that source node 110 performs the entire compression process itself. The detailed operation of the components of IPHC device 127 will be described in further detail with reference to FIG. 3.

Packet-switched network 130 may be any network for which compression of headers is advantageous. For example, packet-switched network 130 may be a mobile portion of a Global System for Mobile Communications (GSM), Universal Mobile Telecommunications System (UMTS), or other wireless network. Alternatively, packet-switched network 130 may be a portion of a network in which satellite-based communications are implemented. Still further, packet-switched network 130 may be a portion of a wireline network in which bandwidth is limited, such as T1 or DS1 leased lines. Suitable variations of packet-switched network 130 will be apparent to those of ordinary skill in the art.

Decompressor node 140 may be a network node that receives data packets from IPHC device 127 via packet-switched network 130, performs header decompression on the packets, and then forwards the packets to destination node 150. Thus, decompressor node 140 may be a radio network controller, packet data serving node, or any other node. Alternatively, decompressor node 140 may be the same node as destination node 150, such that destination node 150 performs the decompression itself.

Destination node 150 may be any device that receives data transmitted from source node 110. Thus, as with source node 110, destination node 150 may be, for example, a user node, a router or switch, a service provider, a server, or a similar system that receives data from a user or other network node.

Having described the components of network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-8.

Exemplary network 100 may currently be serving a flow of packets from source node 110 to destination node 150. Source node 110 may begin by transmitting an uncompressed packet 160a having an uncompressed header to pseudo-compression device 122. Pseudo-compression device 122 may then identify a context identifier (CID) associated with the flow to which the packet belongs or, if no CID is currently assigned to the flow and if there is at least one available CID, assign a new CID to the flow. Pseudo-compression device 122 may then insert the CID into a field of the packet header, such as a total length field.

Pseudo-compression device 122 may also read a version field of the packet header to determine whether the packet is constructed according to IPv4 or IPv6 and set a "V bit" in the header accordingly. Pseudo-compression device 122 may further determine whether the context for the flow has changed and, if it has, may set a "C bit" in the packet header to indicate this fact to the IPHC Device 127. Additionally, pseudo-compression device 122 may set an "F bit" in the header to indicate whether the CID is formatted according to the 8-bit or 16-bit standard.

Pseudo-compression device 122 may then set a "P bit" in the header to indicate that the header has been pseudo-compressed. Various embodiments use the most significant bit of the IP header for the P bit because it corresponds to the most significant bit of the version field. This practice is safe because the majority of IP traffic is currently formatted according to either version 4 or version 6 of the Internet Protocol, representations of which in the 4-bit version field both begin with a zero. Thus, the most significant bit of the IP header would not normally be set and cause a miscommunication between the pseudo-compression device 122 and the IPHC device 127. Finally, pseudo-compression device 122 may transmit the now-pseudo-compressed packet 160b to IPHC device 127.

IPHC device 127 may then receive the pseudo-compressed packet 160b. IPHC device 127 may recognize the packet as containing a pseudo-compressed header by reading the P bit. IPHC device 127 may then read the CID from the pseudo-compressed header and determine whether the packet should be transmitted with a full header, a compressed header, or an uncompressed header. IPHC device 127 may also determine whether the C bit has been set and, if it has, may increment the generation associated with the CID, store the new context, and enter slow-start mode for the flow. IPHC device 127 may then morph the pseudo-compressed header into the appropriate header and then transmit the packet over packet-switched network 130. For example, if IPHC device 127 determines that the packet should be transmitted with a compressed header, IPHC device 127 may remove the pseudo compressed header and replace it with a compressed header. IPHC device 127 may then transmit the compressed packet 160c over packet switched network 130.

In response to receipt of the compressed packet 160c via packet-switched network 130, decompressor node 140 may extract the CID from the compressed packet and uncompress the packet using a locally stored CID database. If the decompressor node 140 instead receives a full header, it may also attempt to store the CID and context in the local CID database for future use before restoring the header to an uncompressed header. If the decompressor node 140 receives an uncompressed header, it may take no decompression action. Decompressor node 140 may finally transmit the uncompressed packet 160d to destination node 150, where it will be received and processed.

In the manner described above, network 100 achieves IP header compression while distributing the implementation among two separate devices with separate processing capabilities. This distribution of the work necessary for IP header compression reduces the amount of time any device must invest in the process and thus allows for IP header compression to be implemented while preserving close to 100% throughput at each of the devices between the source node 110 and the destination node 150.

Figure 2:
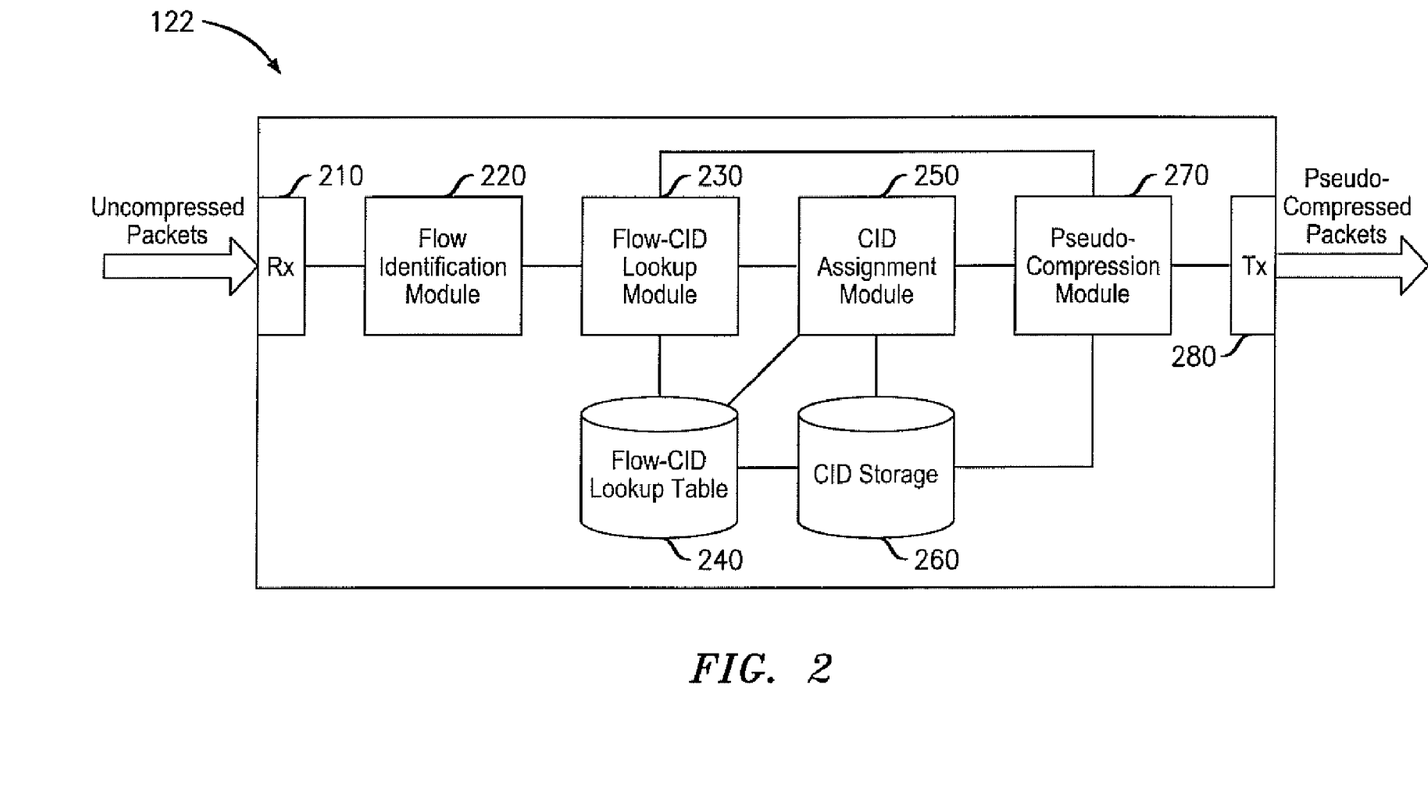
FIG. 2 is a schematic diagram of an exemplary pseudo-compression device.

FIG. 2 is a schematic diagram of an exemplary pseudo-compression device 122. Pseudo-compression device 122 may include a receiver 210, a flow identification module 220, a flow-CID lookup module 230, a flow-CID lookup table 240, a CID assignment module 250, a CID storage 260, a pseudo-compression module 270, and a transmitter 280.

Receiver 210 may be an interface comprising hardware and/or executable instructions encoded on a machine-readable storage medium configured to receive data packets. Receiver 210 may, for example, receive a stream of uncompressed packets from source node 110.

Flow identification module 220 may include hardware and/or executable instructions on a machine-readable storage medium configured to extract flow-identifying information from a received packet. For example, flow identification module 220 may receive an uncompressed packet from receiver 210 and extract information from the header such as the source and destination address. Flow identification module 220 may then pass this flow-identifying information and the uncompressed packet on to flow-CID lookup module 230. Alternatively, flow identification module 220 may pass only the flow-identifying information on to flow-CID lookup module 230 and pass the uncompressed packet directly to the pseudo-compression module 270.

Flow-CID lookup module 230 may include hardware and/or executable instructions on a machine-readable storage medium configured to use flow-identifying information and flow-CID lookup table 240 to determine whether a CID has been assigned to the flow. For example, flow-CID lookup module 230 may receive flow-identifying information from flow identification module 220 and attempt to access a record associated with the flow-identifying information. If flow-CID lookup module 230 finds a record for the flow, flow-CID lookup module 230 may then read the CID from the record and pass it on to pseudo-compression module 270 along with the uncompressed packet if pseudo-compression module 270 has not already received it. If, on the other hand, flow-CID lookup module 230 cannot locate the flow-identifying information in the flow-CID lookup table 240, it may then pass the flow-identifying information to CID assignment module 250.

Flow-CID lookup table 240 may be any machine-readable medium capable of storing records containing flow-identifying information and corresponding assigned CIDs. Flow-CID lookup table 240 may further enable the quick location of a record identified by the flow-identifying information. Thus, flow-CID lookup table 240 may be, for example, a content addressable memory (CAM) or a hash table.

CID assignment module 250 may include hardware and/or executable instructions on a machine-readable storage medium configured to assign a new CID to a flow. For example, CID assignment module 250 may receive flow-identifying information from flow-CID lookup module 230, generate a new CID for the flow, and store the new CID in CID storage 260. CID assignment module 250 may also update flow-CID lookup table 240 to reflect the new record in CID storage 260. CID assignment module 250 may further store the context for the flow in CID storage 260 or it may leave this step for the pseudo-compression module 270 to perform. CID assignment module 250 may then pass the new CID on to pseudo-compression module 270.

CID storage 260 may be any machine-readable medium capable of storing records for each assigned CID. Each record may include an assigned CID and a current context. CID storage 260 may be the same element as flow-CID lookup table 240 or it may be a distinct element. For example, while the flow-CID lookup table may be indexed by the flow-identifying information, CID storage may instead be indexed by CID.

Pseudo-compression module 270 may include hardware and/or executable instructions on a machine-readable storage medium configured to morph an uncompressed header into a pseudo-compressed header. Exemplary structures of a pseudo-compressed header are discussed in greater detail below with reference to FIGS. 4-6. For example, pseudo-compression module 270 may receive an uncompressed packet from any of receiver 210, flow identification module 220, flow-CID lookup module 230, or CID assignment module 250. Pseudo-compression module 270 may further receive a CID associated with the flow to which the uncompressed packet belongs from either flow-CID lookup module 230 or CID assignment module 250. Pseudo-compression module 270 may then change the value of one of the header fields to the value of the CID and set a P bit to 1, to indicate that the packet is now a pseudo-compressed packet.

In various embodiments, pseudo-compression module 270 performs additional functions when morphing a packet header. Pseudo-compression module 270 may read the initial value of the IP version field and set a V bit in the header to indicate whether the packet is constructed according to IPv4 or IPv6. Pseudo-compression module 270 may additionally determine whether the header for the flow has changed by comparing the uncompressed packet header to a context stored in CID storage 260. If the header has indeed changed, pseudo-compression module 270 may set a C bit in the pseudo-compressed header to 1 and update the context stored in CID storage 260 accordingly. Pseudo-compression module 270 may also set an F bit to indicate whether the CID is formatted according to the 8-bit or 16-bit standard, as described by RFC 2507. After the pseudo-compression module 270 has finished morphing the uncompressed packet into a pseudo-compressed packet, it may then pass the packet on to transmitter 280.

Transmitter 280 may be an interface comprising hardware and/or executable instructions encoded on a machine-readable storage medium configured to transmit data packets. Transmitter 280 may, for example, transmit a stream of pseudo-compressed packets to IPHC device 127.

It should be apparent that the illustrated components of pseudo-compression device 122 are exemplary and that pseudo-compression device 122 may include additional components. For example, pseudo-compression device 122 may contain additional hardware and/or executable instructions encoded on a machine-readable storage medium (not shown) for performing other functions such as, for example, packet routing and/or internal packet encapsulation. Furthermore, the described functions of pseudo-compression device 122 may be rearranged, such that the functions of multiple components are merged into a single component or, alternatively, the functions of a single component are divided among multiple components. Other suitable arrangements will be apparent to those of skill in the art.

Figure 3:
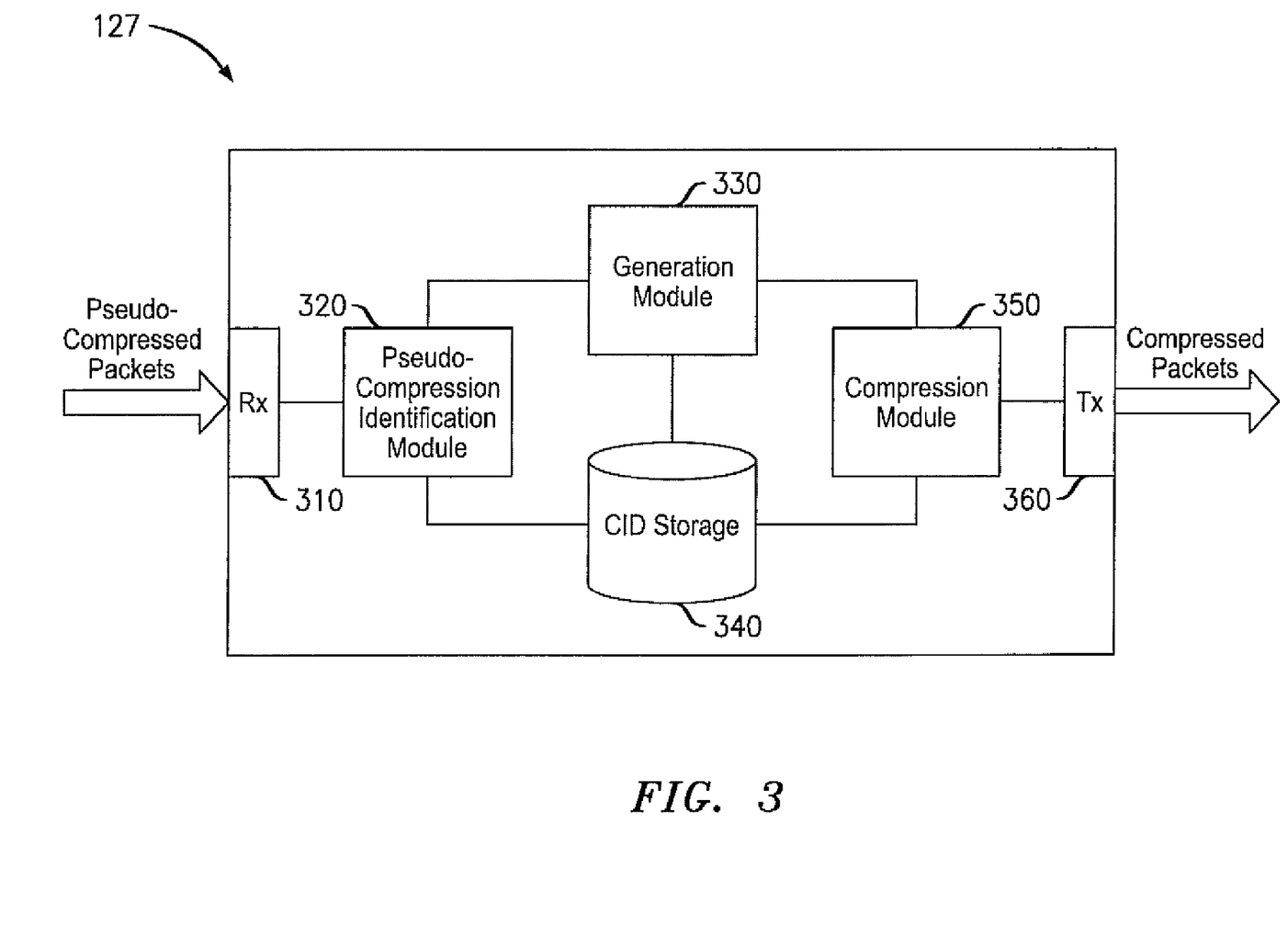
FIG. 3 is a schematic diagram of an exemplary IP header compression device.

FIG. 3 is a schematic diagram of an exemplary IP header compression device 127. IPHC device 127 may include a receiver 310, a pseudo-compression identification module 320, a generation module 330, a CID storage 340, a compression module 350, and a transmitter 360.

Receiver 310 may be an interface comprising hardware and/or executable instructions encoded on a machine-readable storage medium configured to receive data packets. Receiver 310 may, for example, receive a stream of pseudo-compressed packets from pseudo-compression device 122.

Pseudo-compression identification module 320 may include hardware and/or executable instructions on a machine-readable storage medium configured to determine whether a received packet is a pseudo-compressed packet. For example, pseudo-compression identification module 320 may read the P bit in the header of each packet. If the P-bit is set, pseudo-compression identification module 320 may forward the packet to generation module 330. If the P-bit is not set, pseudo-compression identification module 320 may transmit the packet to other modules (not shown) for implementing other functions unrelated to IP header compression.

Generation module 330 may include hardware and/or executable instructions on a machine-readable storage medium configured to determine whether the generation for the CID should be incremented. For example, generation module 330 may receive a pseudo-compressed packet from pseudo-compression identification module 320 and read the C bit from the pseudo-compressed header. If the C-bit is not set, the generation module 330 may simply pass the pseudo-compressed packet to compression module 350.

If, on the other hand, the C bit is set, the generation module knows that the context for the flow has changed (as determined by pseudo-compression device 122). Accordingly, generation module 330 may then increment a generation associated with the CID in CID storage 340. Generation module 330 may also update slow-start information associated with the CID in CID storage 340 to indicate that the flow should begin slow-start in order to ensure that decompressor node 140 has an up-to-date context for the flow. Generation module 330 may then transmit the pseudo-compressed packet to compression module 350.

CID storage 340 may be any machine-readable medium capable of storing records for each assigned CID. Each record may store a CID, a current generation for the CID, and other information related to the slow-start procedure. Such slow-start information may include, for example, an indication of whether slow-start mode is active, the number of packets sent since the last full-header packet was sent, and/or the time that the last full-header packet was sent.

Compression module 350 may include hardware and/or executable instructions on a machine-readable storage medium configured to determine whether a pseudo-compressed packet should be transmitted as an uncompressed packet, compressed packet, or full-header packet and morph the pseudo-compressed header accordingly. For example, compression module 350 may receive a pseudo-compressed packet from generation module 330 and first determine whether the packet should be transmitted as an uncompressed packet. Compression module 350 may make this determination, for example, by determining whether the generation for the CID has wrapped around or whether the packet can be sent to a decompressor node 140 on its way to destination node 150. If the packet should be transmitted as an uncompressed packet, compression module 350 may morph the pseudo-compressed packet back into an uncompressed packet by restoring the values of the header fields changed by pseudo-compression device 122.

If the packet should not be transmitted as an uncompressed packet, compression module 350 may refer to the slow-start information associated with the CID to determine whether the packet should be transmitted with a full header or a compressed header. After this determination has been made, compression module 350 may morph the pseudo-compressed header accordingly.

Transmitter 360 may be an interface comprising hardware and/or executable instructions encoded on a machine-readable storage medium configured to transmit data packets. Transmitter 360 may, for example, transmit a stream of uncompressed, compressed, and/or full-header packets to decompressor node 140 via packet-switched network 130.

It should be apparent that the illustrated components of IPHC device 127 are exemplary and that IPHC device 127 may include additional components. For example, IPHC device 127 may contain additional hardware and/or executable instructions encoded on a machine-readable storage medium (not shown) for performing other functions such as, for example, packet routing, packet scheduling, and quality of service functions. Furthermore, the described functions of IPHC device 127 may be rearranged, such that the functions of multiple components are merged into a single component or, alternatively, the functions of a single component are divided among multiple components. Other suitable arrangements will be apparent to those of skill in the art.

Figure 4:
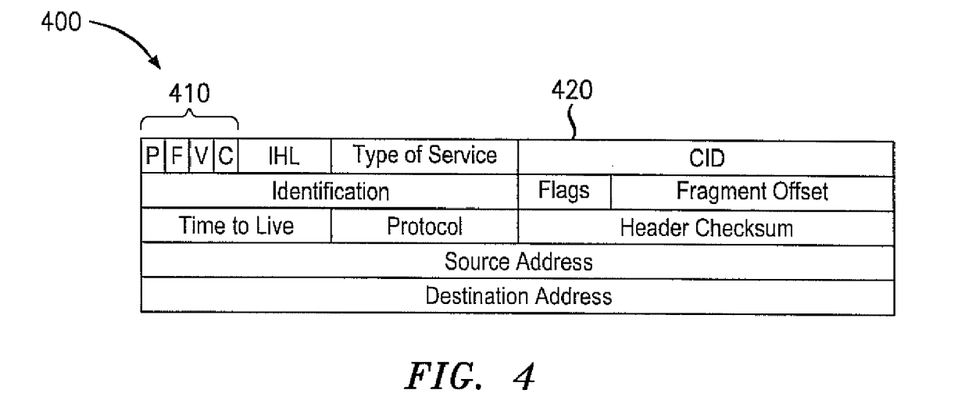
FIG. 4 is a schematic diagram of an exemplary pseudo-compressed IP header.

FIG. 4 is a schematic diagram of an exemplary pseudo-compressed IP header 400. Pseudo-compressed IP header 400 may include unmodified fields such as, for example, the Internet Header Length (IHL), type of service, identification, flags, fragment offset, time to live, protocol, header checksum, source address, and destination address fields.

Pseudo-compressed IP header 400 may additionally include modified header fields. For example, field 410 may correspond to the version field of an uncompressed IP header. Field 410 may be broken into four one-bit fields including a P, F, V, and C bit The P bit may be used to indicate that the header is a pseudo-compressed header. The F bit may be used to indicate the CID format used, as provided for by RFC 2507. The V bit may be used to indicate whether the packet is formatted according to IPv4 or IPv6, as determined from the initial value of field 410. Finally, the C bit may be used to indicate whether the context for the flow to which the packet header belongs has changed, thus necessitating the increment of the generation.

Pseudo-compressed IP header may include a further modified field 420. Field 420 may correspond to the total length field of an uncompressed IP header. Field 420 may be used to indicate the CID for the flow to which the packet header belongs.

Figure 5:
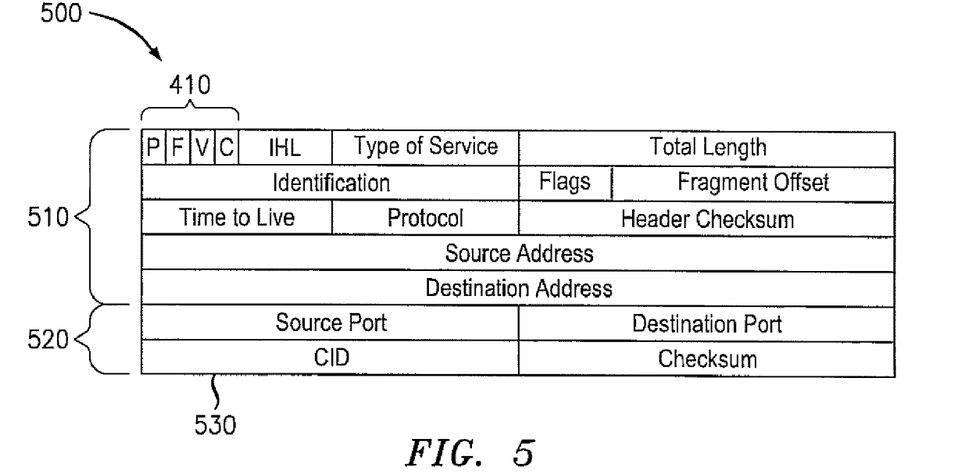
FIG. 5 is a schematic diagram of an exemplary pseudo-compressed IP/UDP header.

FIG. 5 is a schematic diagram of an exemplary pseudo-compressed IP/UDP header 400. Pseudo-compressed IP/UDP header may include an IP portion 510 and a UDP portion 520. IP portion 510 may include unmodified fields such as, for example, the IHL, type of service, total length, identification, flags, fragment offset, time to live, protocol, header checksum, source address, and destination address fields. Likewise, UDP portion 520 may include unmodified fields such as, for example, the source port, destination port, and checksum fields.

As described above with reference to pseudo-compressed IP header 400 of FIG. 4, field 410 of pseudo-compressed IP/UDP header 500 may be used to carry the P, F, V, and C bits. IP/UDP header 500 may also include field 530 which corresponds to the length field of an uncompressed IP/UDP packet. Field 530 may be used to indicate the CID for the flow to which the packet header belongs.

Figure 6:
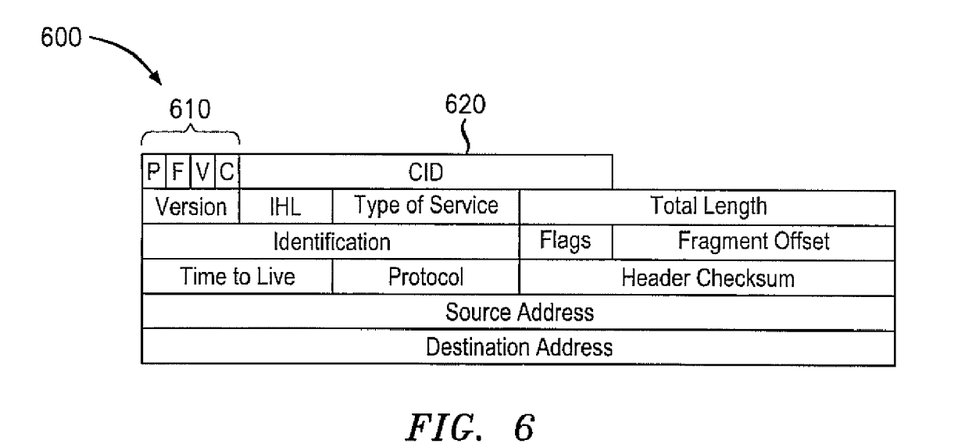
FIG. 6 is a schematic diagram of an exemplary pseudo-compressed MPLS header.

FIG. 6 is a schematic diagram of an alternative pseudo-compressed IP header 600. Pseudo-compressed IP header 600 may contain all the unmodified fields of a corresponding uncompressed IP header. Pseudo-compressed IP header 600 may contain additional fields added to the header by a pseudo-compression device 122 such as field 610 and field 620. Field 610 may carry the P, F, V, and C bits, as described above with reference to FIG. 4. Field 620 may carry the CID for the flow to which the packet belongs. Fields 610, 620 may be added at the beginning, the end, or any point in pseudo-compressed IP header 600. Further, fields 610, 620 may be added to the end of a payload associated with pseudo-compressed IP header 600.

It should be apparent that the information conveyed by any pseudo-compressed header, for example pseudo-compressed headers 400, 500, 600, is not tied to the header field carrying the information. Accordingly, virtually any header field or fields may be used to convey the necessary information as long as there is agreement between the pseudo-compression device 122 and the IPHC device 127 as to where each piece of information will be located in the pseudo compressed header. It should also be apparent that the methods described are not tied to any specific set of protocols. The header fields of any packet that may be compressed according to RFC 2507 may be used to convey the same information to the IPHC device 127, regardless of the protocol. The fields of an MPLS header, for example, could be used to convey the necessary information.

Figure 7A:
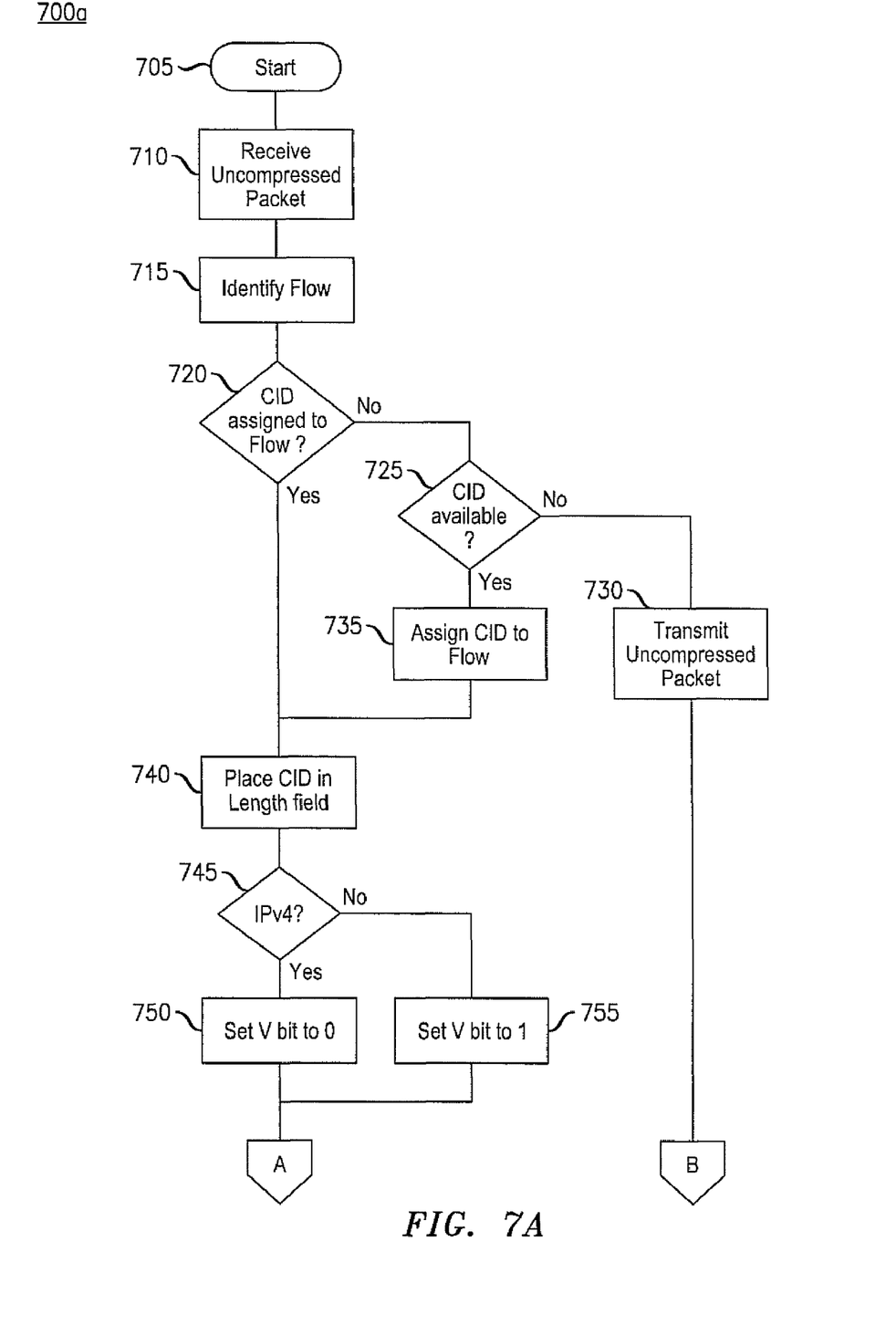
FIG. 7A is a first portion of a flowchart of an exemplary method for pseudo-compressing uncompressed headers.
Figure 7B:
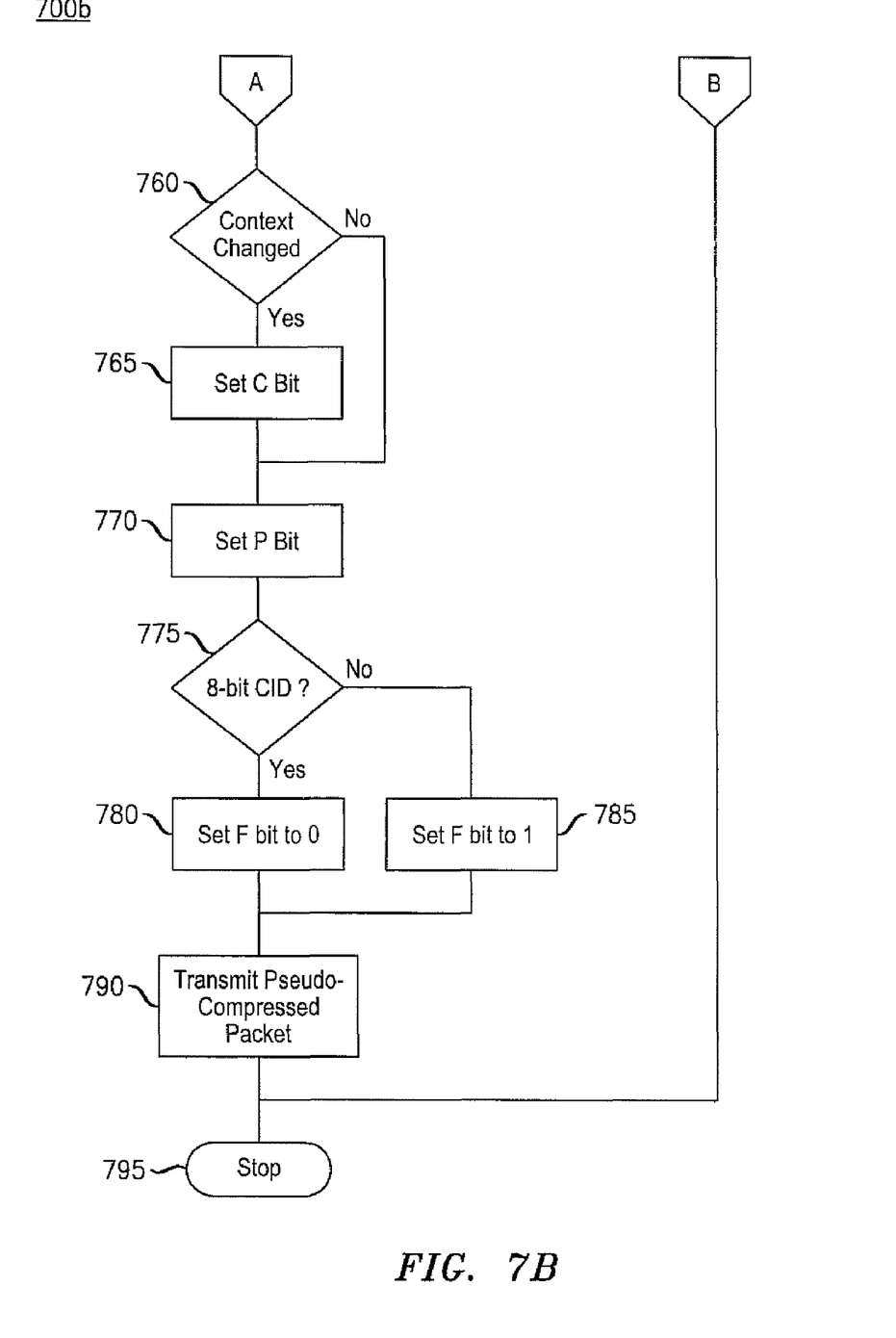
FIG. 7B is a second portion of a flowchart of an exemplary method for pseudo-compressing uncompressed headers.

FIGS. 7A-B illustrate a flowchart of an exemplary method 700a, 700b for pseudo-compressing uncompressed headers. Exemplary method 700a, 700b may be performed in pseudo-compression device 122.

Method 700a, 700b may begin at step 705 and move on to step 710, where pseudo-compression device 122 receives an uncompressed packet. Method 700a, 700b may then proceed to step 715, where pseudo-compression device 122 may identify the flow to which the packet belongs by reading flow-identifying information from the packet header such as, for example, the source and destination addresses. Method 700a, 700b may then move to step 720 where, using the flow-identifying information extracted in step 715, pseudo-compression device may determine whether there is a CID associated with the flow by, for example, referencing a flow-CID lookup table. If the flow already has an assigned CID, method 700a, 700b may proceed to 740. Otherwise, method 700a, 700b may proceed to step 725.

Pseudo-compression device 122 may determine whether any CIDs are available at step 725. If all possible CIDs have been assigned to other flows or are otherwise unavailable, pseudo-compression device may not be able to assign a CID to the flow and thus IPHC may not be available for the flow. Therefore, if no CID is available at step 725, method 700*a*, 700*b* may proceed to step 730 where pseudo-compression device 122 may simply transmit the uncompressed packet and then end at step 795.

If, on the other hand, a CID is available at step 725, method 700*a*, 700*b* may proceed to step 735. At step 735, pseudo-compression device 122 may assign a new CID to the flow and method 700*a*, 700*b* may then proceed to step 740. At step 740, pseudo-compression device 122 may insert the CID of the flow into the header of the packet. Pseudo-compression device 122 may, for example, replace the value of the length field in the packet header with the CID.

Method 700*a*, 700*b* may then proceed to step 745, where pseudo-compression device may determine whether the packet is formed according to IPv4. Pseudo-compression device 122 may accomplish this, for example, by reading the version IP header field. If the packet is an IPv4 packet, method 700*a*, 700*b* may proceed to step 750 where pseudo-compression device 122 may set the V bit to zero. Method 700*a*, 700*b* may then proceed to step 760.

If, on the other hand, the pseudo-compression device 122 determines at step 745 that the packet is not an IPv4 packet (likely indicating that it is instead an IPv6 packet), pseudo-compression device may set the V bit equal to one at step 755. Method 700*a*, 700*b* may then proceed to step 760.

At step 760, pseudo-compression device 122 may determine whether the context for the flow has changed by, for example, comparing the packet header to a locally stored context for the flow. If the context has changed, method 700*a*, 700*b* may proceed to step 765. Otherwise, method 700*a*, 700*b* may proceed to step 770.

At step 765, pseudo-compression device 122 may set the C bit of the packet header to indicate to the IPHC device 127 that the context has changed for this flow. Pseudo-compression device 122 may also store the new context for the flow at this step. Method 700*a*, 700*b* may then proceed to step 770, where pseudo-compression device may set the P bit to indicate to the IPHC device 127 that the packet is a pseudo-compressed packet. Method 700*a*, 700*b* may then move to step 775 where pseudo-compression device 122 may determine whether the CID is an 8-bit CID as provided for by RFC 2507. If the CID is an 8-bit CID, pseudo-compression device 122 may set the F bit to zero in step 780 and move on to step 790. Otherwise, pseudo-compression device 122 may set the F bit to one in step 785 to indicate that the CID is a 16-bit CID and then move on to step 790. At step 790, the pseudo-compression device may transmit the pseudo compressed packet to the IPHC device 127, and then move on to step 795, where method 700*a*, 700*b* ends.

Figure 8:
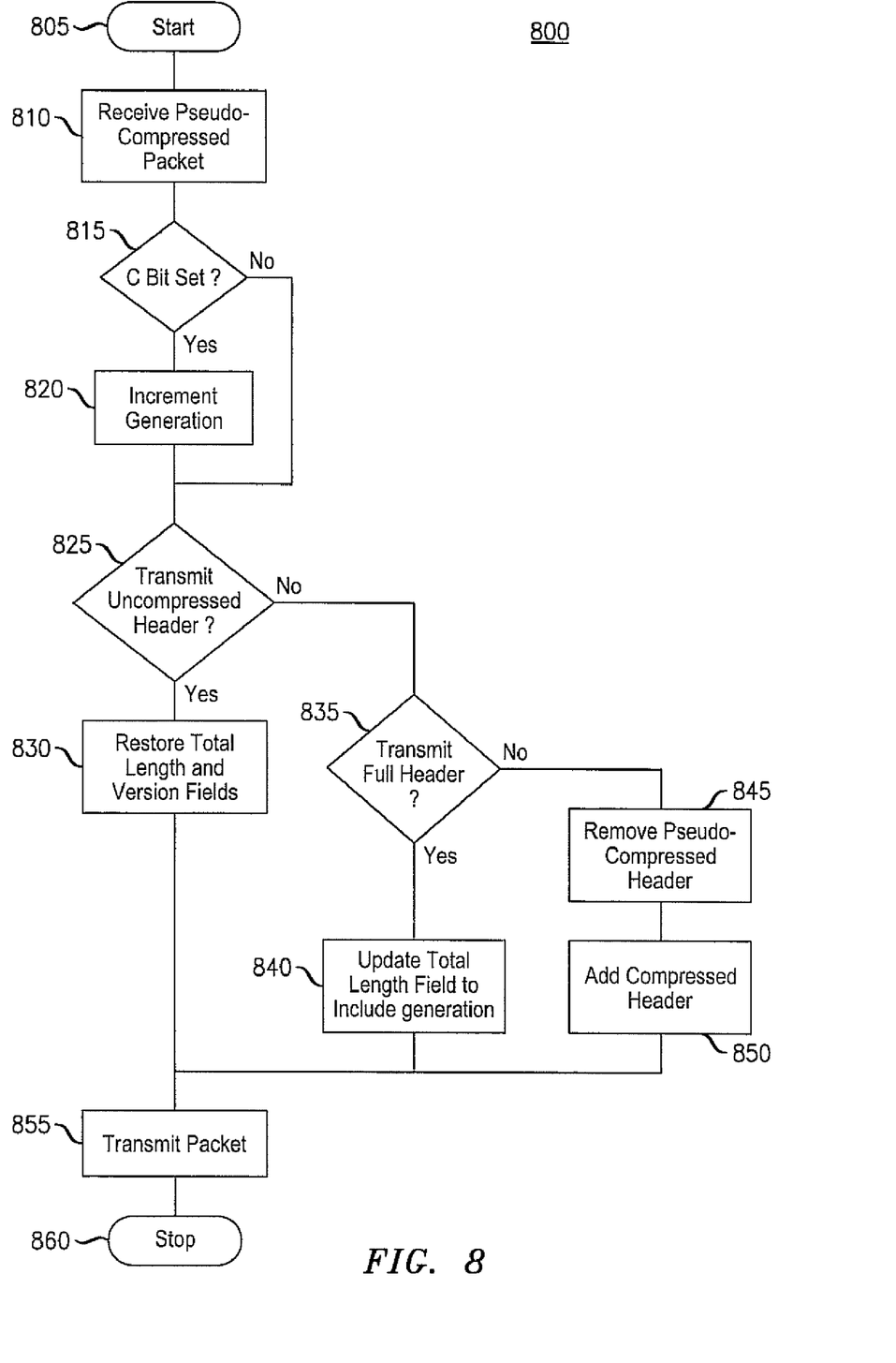
FIG. 8 is a flowchart of an exemplary method for morphing a pseudo-compressed header into an appropriate header for transmission over a network.

FIG. 8 is a flowchart of an exemplary method 800 for morphing a pseudo-compressed header into an appropriate header for transmission over a network. Method 800 may be performed by IPHC device 127.

Method 800 begins at step 805 and proceeds to step 810, where the IPHC device 127 may receive a pseudo-compressed packet. At this step, IPHC device 127 may also determine that the packet is pseudo-compressed by reading the P bit. Method 800 may then proceed to step 815 where IPHC device 127 may check whether the C bit has been set, indicating that the context for the flow has changed. If the C bit has not been set, method 800 may proceed to step 825. Otherwise, method 800 may proceed to step 820 where IPHC may increment a generation associated with the CID carried by the pseudo-compressed packet. This generation increment may also cause the flow to enter slow-start mode to ensure that decompressor node 140 remains up-to-date with the current context and generation. Method 800 may then proceed to step 825.

At step 825, IPHC device 127 may determine whether the pseudo-compressed packet should be transmitted as an uncompressed packet. This determination may include, for example, determining whether the flow supports IPHC or whether the generation for the CID has wrapped around recently. If the pseudo-compressed packet is to be transmitted as an uncompressed packet, method 800 may proceed to step 830 where IPHC device 127 may morph the pseudo-compressed packet back into an uncompressed packet. This may include restoring the version field to the proper 4-bit IP version as indicated by the V bit. This morphing may further include restoring a total length field to the original value by, for example, counting the number of bytes in the pseudo-compressed packet or reading the number of bytes from a bus between pseudo-compression device 122 and IPHC device 127. Alternatively, the original value of the total length field may be preserved by the pseudo-compression device 122 by moving the value to another field of the header or inserting the value into a Layer 2 header field. In this alternative embodiment, IPHC device 127 may simply read the original value of the total length field from the field now carrying the value. Method 800 may then proceed to step 855.

If it is determined at step 825 that the pseudo-compressed packet should not be transmitted as an uncompressed packet, method 800 may proceed to step 835, where IPHC device 127 may determine whether the packet should be transmitted with a full header. This determination may include, for example, determining whether the flow is currently in slow-start mode and determining how many compressed headers have been transmitted for the flow since the last full header was transmitted. If it is determined that the packet should be transmitted with a full header, method 800 may proceed to step 840. At step 840, IPHC device 127 may morph the pseudo-compressed header into a full header. This may include, for example, updating a field of the header to include an indication of the current generation for the flow and restoring a version field to its uncompressed value. Method 800 may then proceed to 855.

If it is determined at step 835 that the packet should not be transmitted as a full header, method 800 may then proceed to step 845. Because it has been determined that the packet should not be transmitted with either an uncompressed header or a full header, IPHC device 127 may proceed to morph the pseudo-compressed header into a compressed header. IPHC device 127 may begin this morphing process in step 845 by completely removing the pseudo-compressed header from the packet and proceeding to step 850. At step 850, IPHC device 127 may add a compressed header to the packet. The compressed header may be formed according to RFC 2507 and may include fields such as the CID, generation, F bit, and D bit. In the case of a UDP packet, the compressed header may also include a UDP checksum. Method 800 may then proceed to step 855.

At step 855, IPHC device 127 may transmit the morphed packet to decompressor node 140 via packet-switched network 130. Method 800 may then stop at step 860.

According to the foregoing, various exemplary embodiments allow for the processing and transmitting of IPHC packets at near 100% line rate. In particular, by dividing the work that must be performed between multiple devices, no single device is significantly slowed down by the implementation of IPHC. Further, by providing that a first device morph a packet to be compressed into a pseudo-compressed packet and that a second device morph a pseudo-compressed packet into an appropriate packet for transmission, the work is efficiently distributed between the two devices. Various exemplary embodiments achieve this goal without significantly increasing the overhead associated with the processing of each packet due to considerations such as CID storage consistency.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A system for providing header compression in a communications network, the system comprising:
  a first stage device that performs the following steps:
    receiving a packet having an uncompressed header that belongs to a flow,
    identifying a context identifier (CID) associated with the flow,
    morphing the uncompressed header into a pseudo-compressed header,
    transmitting the received packet with the pseudo-compressed header, and
    determining that a context for the flow has changed by comparing the uncompressed header to a stored context for the flow, wherein the pseudo-compressed header comprises the CID associated with the flow, an indication that the header is pseudo-compressed, and an indication whether the context for the flow has changed; and
  a second stage device that performs the following steps:
    receiving the packet having the pseudo-compressed header,
    determining that the received packet has the pseudo-compressed header by reading the indication that the header is pseudo-compressed,
    determining whether the received packet should be transmitted over the communications network with a compressed header, a full header, or an uncompressed header,
    morphing the pseudo-compressed header into the compressed header when the received packet should be transmitted with the compressed header,
    morphing the pseudo-compressed header into the full header when the received packet should be transmitted with the full header,
    morphing the pseudo-compressed header into the uncompressed header when the received packet should be transmitted with the uncompressed header,
    determining that the context for the flow has changed by reading the indication,
    incrementing a generation number for the flow, and
    transmitting the received packet over the communications network after morphing the pseudo-compressed header.

2. The system of claim 1, wherein, in identifying the CID associated with the flow, the first stage device accesses a flow lookup table that associates each flow of a plurality of flows with an assigned CID.

3. The system of claim 2, wherein, in identifying the CID associated with the flow, the first stage device assigns the CID to the flow when the flow lookup table does not store an association for the flow.

4. The system of claim 1, wherein, in morphing the uncompressed header into the pseudo-compressed header, the first stage device changes an original value of a first field of the uncompressed header to the CID and changes an original value of a second field of the uncompressed header to the indication that the header is pseudo-compressed.

5. The system of claim 4, wherein, in morphing the pseudo-compressed header into the uncompressed header, the second stage device determines a length and a protocol of the received packet, changes the value of the first field to the length, and changes the value of the second field to an indication of the protocol.

6. The system of claim 1, wherein, in morphing the pseudo-compressed header into the compressed header, the second stage device removes the pseudo-compressed header from the received packet and adds the compressed header to the received packet, wherein the compressed header comprises the CID and the generation number.

7. The system of claim 1, wherein, in determining whether the packet should be transmitted over the communications network with the compressed header, the full header, or the uncompressed header, the second stage device determines whether it is currently operating in a slow-start mode for the flow.

8. A method of performing header compression in a communications network, the method comprising:
  receiving, in a network node, a packet having an uncompressed header and belonging to a flow;
  identifying a context identifier (CID) associated with the flow;
  morphing the uncompressed header into a pseudo-compressed header, wherein the pseudo-compressed header comprises the identified CID associated with the flow;
  determining whether the received packet should be transmitted with a compressed header, a full header, or an uncompressed header;
  removing the pseudo-compressed header and adding the compressed header to the packet to form an outgoing packet when the received packet should be transmitted with the compressed header;
  modifying the pseudo-compressed header into the full header to form the outgoing packet when the received packet should be transmitted with the full header;
  restoring the uncompressed header to form the outgoing packet when the received packet should be transmitted with the uncompressed header;
  determining whether a context for the flow has changed by comparing the uncompressed header to a stored context for the flow;

adding an indication to the pseudo-compressed header when the context for the flow has changed;
incrementing a generation number for the flow when the pseudo-compressed header contains the indication; and
transmitting the outgoing packet over the communications network.

9. The method of claim 8, wherein the step of identifying the CID comprises:
referencing a flow lookup table that associates each flow of a plurality of flows with the CID.

10. The method of claim 9, wherein the step of identifying the CID further comprises, when the flow lookup table contains no entry for the flow,
assigning a new CID to the flow.

11. The method of claim 8, wherein the step of morphing the uncompressed header into the pseudo-compressed header comprises:
changing an original value of a field of the uncompressed header to the CID.

12. The method of claim 11, wherein the step of restoring the pseudo-compressed header to the uncompressed header comprises:
determining a length of the received packet; and changing the value of the field to the determined length.

13. The method of claim 8, wherein the step of determining whether the packet should be transmitted with the compressed header, the full header, or the uncompressed header comprises:
determining whether the flow should begin operating in a slow-start mode by determining whether the generation number for the flow has been incremented;
when the flow should begin operating in the slow-start mode, determining that the packet should be transmitted with the full header;
determining whether the flow is currently operating in the slow-start mode; and
when the flow is currently operating in the slow-start mode, determining whether the packet should be transmitted with the full header or with the uncompressed header.

14. A network device for offloading a portion of work performed by a header compression device, the network device comprising:
a flow lookup table that associates each flow of a plurality of flows with an assigned context identifier (CID);
a receiver that receives a packet having an uncompressed header;
a flow identification module that identifies a flow to which the received packet belongs;
a flow-CID lookup module that uses the flow lookup table to identify a CID assigned to the identified flow;
a pseudo-compression module that compares the uncompressed header to a stored context for the flow and morphs the uncompressed header into a pseudo-compressed header, wherein the pseudo-compressed header comprises the CID, an indication whether the context for the flow has changed, and an indication that the header is the pseudo-compressed header;
a generation module that increments a generation number for the flow when the pseudo-compressed header contains the indication that the context for the flow has changed;
and a transmitter that transmits the packet having the pseudo-compressed header to the header compression device.

15. The network device of claim 14, wherein the flow lookup table is a content-addressable memory.

16. The network device of claim 14, further comprising:
a CID storage that stores the contexts and assigned CIDs for each flow and wherein the pseudo-compression module further determines whether the context for the flow has changed by comparing the uncompressed header to a context stored in the CID storage and inserts the indication that the context for the flow has changed into the pseudo-compressed header.

17. The network device of claim 14, further comprising:
a CID assignment module that, when the flow lookup table does not contain a record for the flow, assigns a new CID to the flow.

18. The network device of claim 14, wherein, in morphing the uncompressed header, the pseudo-compression module replaces an original value of a first field of the uncompressed header with the CID and replaces an original value of a second field of the uncompressed header with the indication that the header is the pseudo-compressed header.

* * * * *